US012683834B2

(12) United States Patent
Wang et al.

(10) Patent No.: US 12,683,834 B2
(45) Date of Patent: Jul. 14, 2026

(54) METHOD AND SYSTEM FOR SETTING DIGITAL EQUALIZER

(71) Applicant: REALTEK SEMICONDUCTOR CORP., Hsinchu (TW)

(72) Inventors: Sheng-Jie Wang, Hsinchu (TW);
Cheng-Hsien Li, Hsinchu (TW);
Yu-Hung Tan, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 18/937,373

(22) Filed: Nov. 5, 2024

(65) Prior Publication Data

US 2025/0240190 A1     Jul. 24, 2025

(30) Foreign Application Priority Data

Jan. 24, 2024    (TW) ................................. 113102666

(51) Int. Cl.
H04L 25/03          (2006.01)

(52) U.S. Cl.
CPC .. H04L 25/03019 (2013.01); H04L 25/03267 (2013.01)

(58) Field of Classification Search
CPC ............... H04L 25/026; H04L 25/0264; H04L 25/0292; H04L 25/03006; H04L 25/03019; H04L 25/03057; H04L 25/03254; H04L 25/03267; H04L 25/03878; H04L 25/03885; H04L 25/085; H04L 2025/03433; H04L 2025/03681; H04L 2025/037; H04L 2025/03726; H04L 2025/03732
USPC ....... 375/219, 220, 232, 233, 257, 258, 285, 375/346, 348, 350; 333/28 R, 204, 206; 708/322, 323
See application file for complete search history.

(56) References Cited

U.S. PATENT DOCUMENTS

| 2004/0022311 A1* | 2/2004 | Zerbe ................ H04L 25/03057 375/229 |
| 2022/0276389 A1* | 9/2022 | Yu ........................... G01S 19/21 |
| 2023/0171081 A1* | 6/2023 | Alnabulsi ............... H04L 7/033 713/503 |

* cited by examiner

*Primary Examiner* — Young T. Tse
(74) *Attorney, Agent, or Firm* — Li & Cai Intellectual Property (USA) Office

(57) ABSTRACT
A method and a system for setting a digital equalizer are provided. The method and the system are applicable to a signal receiver. The signal receiver includes a digital signal processor, the digital signal processor includes a target digital equalizer, and the target digital equalizer has an equalizer coefficient. The method includes: obtaining, during a simulation phase, a plurality of coefficient initial values and a plurality of coefficient limit values that respectively correspond to a plurality of preset transmission channels; and setting, during a connection phase, the equalizer coefficient of the target digital equalizer according to the coefficient initial value and the coefficient limit value corresponding to one of the preset transmission channels.

13 Claims, 5 Drawing Sheets configuring, during a simulation phase, a first electronic device as a link partner to sequentially select one of a plurality of preset transmission channels for connection with a signal receiver, and configuring a second electronic device to execute a search program each time when the first electronic device is connected to the signal receiver via one of the preset transmission channels, so as to obtain a plurality of coefficient initial values and a plurality of coefficient limit values that respectively correspond to the preset transmission channels ⌐∽S300 configuring, during a connection phase, a processor to set an equalizer coefficient of a target digital equalizer according to the coefficient initial value and the coefficient limit value corresponding to one of the preset transmission channels ⌐∽S302

FIG. 3

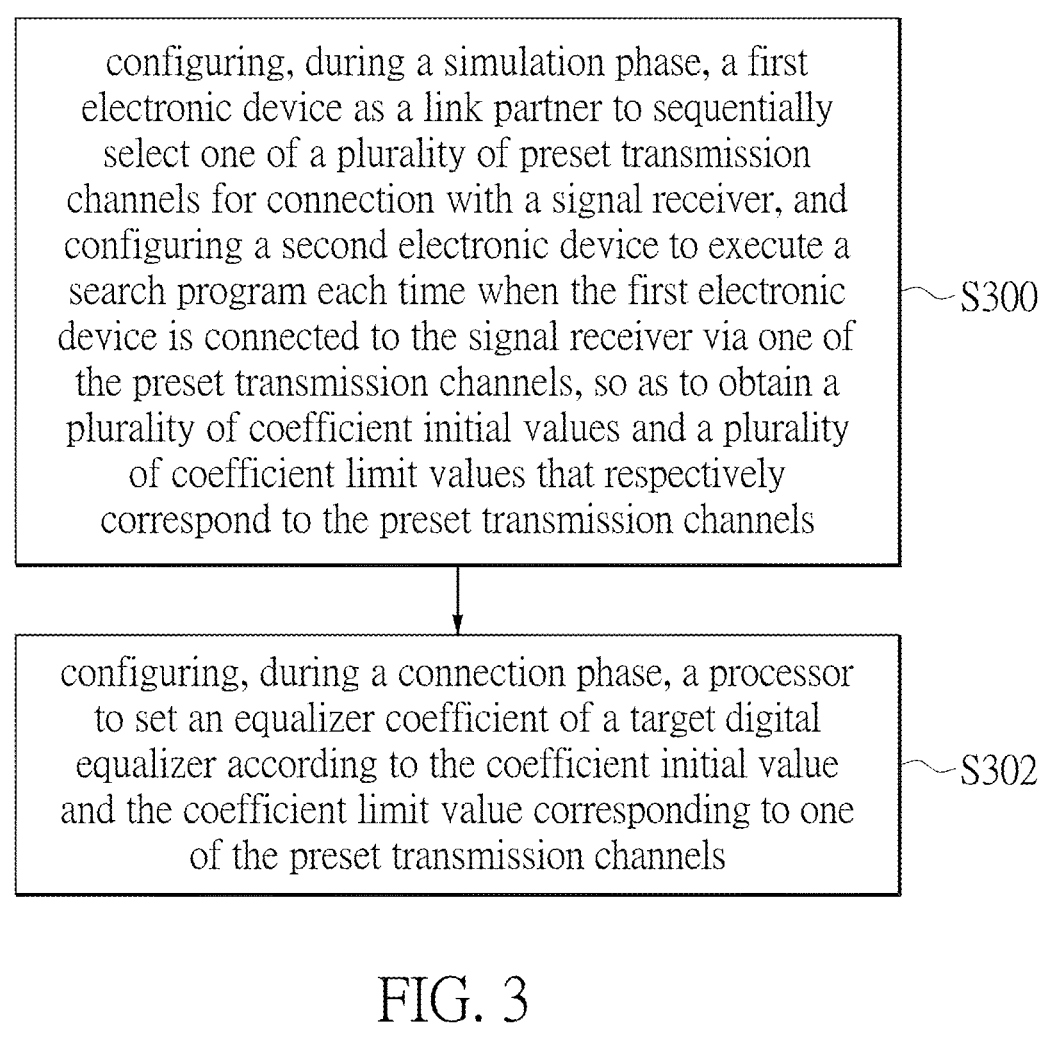

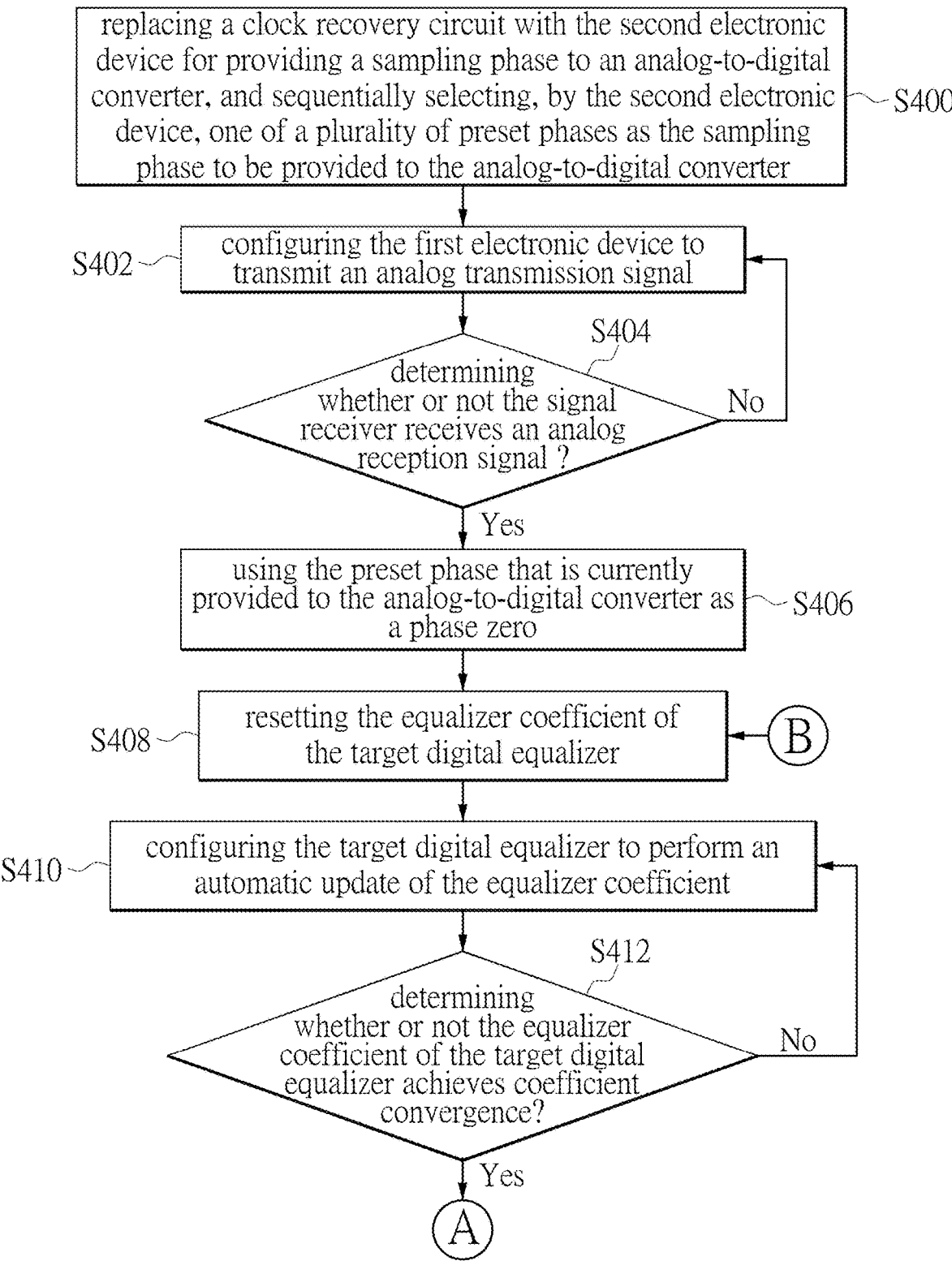

replacing a clock recovery circuit with the second electronic device for providing a sampling phase to an analog-to-digital converter, and sequentially selecting, by the second electronic device, one of a plurality of preset phases as the sampling phase to be provided to the analog-to-digital converter ～S400

S402 ～ configuring the first electronic device to transmit an analog transmission signal S404
determining whether or not the signal receiver receives an analog reception signal ? No Yes using the preset phase that is currently provided to the analog-to-digital converter as a phase zero ～S406

S408 ～ resetting the equalizer coefficient of the target digital equalizer (B)

S410 ～ configuring the target digital equalizer to perform an automatic update of the equalizer coefficient S412
determining whether or not the equalizer coefficient of the target digital equalizer achieves coefficient convergence? No Yes (A)

FIG. 4A

METHOD AND SYSTEM FOR SETTING DIGITAL EQUALIZER

CROSS-REFERENCE TO RELATED PATENT APPLICATION

This application claims the benefit of priority to Taiwan Patent Application No. 113102666, filed on Jan. 24, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method and a system for setting a digital equalizer, and more particularly to a method and a system for setting an equalizer coefficient of a digital equalizer.

BACKGROUND OF THE DISCLOSURE

Generally, in the field of digital communications, when an analog transmission signal transmitted by a signal transmitter travels through an unoptimized transmission channel, inter-symbol interference (ISI) is introduced, such that a slicer input signal of a signal receiver has a decreased signal-to-noise ratio (SNR), and the signal receiver has difficulty in identifying the analog transmission signal transmitted by the signal transmitter. Hence, a digital equalizer is added into the signal receiver.

The digital equalizer is a filter, and can perform channel equalization on a channel response of the transmission channel, so as to filter out the inter-symbol interference and increase the signal-to-noise ratio of the slicer input signal. However, the filtering ability of the digital equalizer for the inter-symbol interference can be affected by an equalizer coefficient (otherwise referred to as a filter coefficient). Therefore, how to set the equalizer coefficient of the digital equalizer has become one of the important issues to be solved in the related art.

SUMMARY OF THE DISCLOSURE

In response to the above-referenced technical inadequacy, the present disclosure provides a method and a system for setting an equalizer coefficient of a digital equalizer.

In order to solve the above-mentioned problem, one of the technical aspects adopted by the present disclosure is to provide a method for setting a digital equalizer. The method is applicable to a signal receiver, the signal receiver includes a digital signal processor, the digital signal processor includes a target digital equalizer, and the target digital equalizer has an equalizer coefficient. The method includes: configuring, during a simulation phase, a first electronic device as a link partner to sequentially select one of a plurality of preset transmission channels for connection with the signal receiver, and configuring a second electronic device to execute a search program each time when the first electronic device is connected to the signal receiver via one of the preset transmission channels, so as to obtain a plurality of coefficient initial values and a plurality of coefficient limit values that respectively correspond to the preset transmission channels; and configuring, during a connection phase, a processor to set the equalizer coefficient of the target digital equalizer according to the coefficient initial value and the coefficient limit value corresponding to one of the preset transmission channels.

In order to solve the above-mentioned problem, another one of the technical aspects adopted by the present disclosure is to provide a system for setting a digital equalizer. The system is applicable to a signal receiver, the signal receiver includes a digital signal processor, the digital signal processor includes a target digital equalizer, and the target digital equalizer has an equalizer coefficient. The system includes a first electronic device, a second electronic device, and a processor. During a simulation phase, the first electronic device is configured as a link partner to sequentially select one of a plurality of preset transmission channels for connection with the signal receiver. The second electronic device is coupled to the first electronic device and the signal receiver during the simulation phase. The second electronic device is configured to execute a search program each time when the first electronic device is connected to the signal receiver via one of the preset transmission channels, so as to obtain a plurality of coefficient initial values and a plurality of coefficient limit values that respectively correspond to the preset transmission channels. The processor is disposed in the signal receiver. During a connection phase, the processor is configured to set the equalizer coefficient of the target digital equalizer according to the coefficient initial value and the coefficient limit value corresponding to one of the preset transmission channels.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 3 is a flowchart of a method for setting the digital equalizer according to one embodiment of the present disclosure; and FIG. 4A and FIG. 4B are flowcharts of a search program according to one embodiment of the present disclosure.

DETAILED DESCRIPTION OF THE EXEMPLARY EMBODIMENTS

Figure 1:
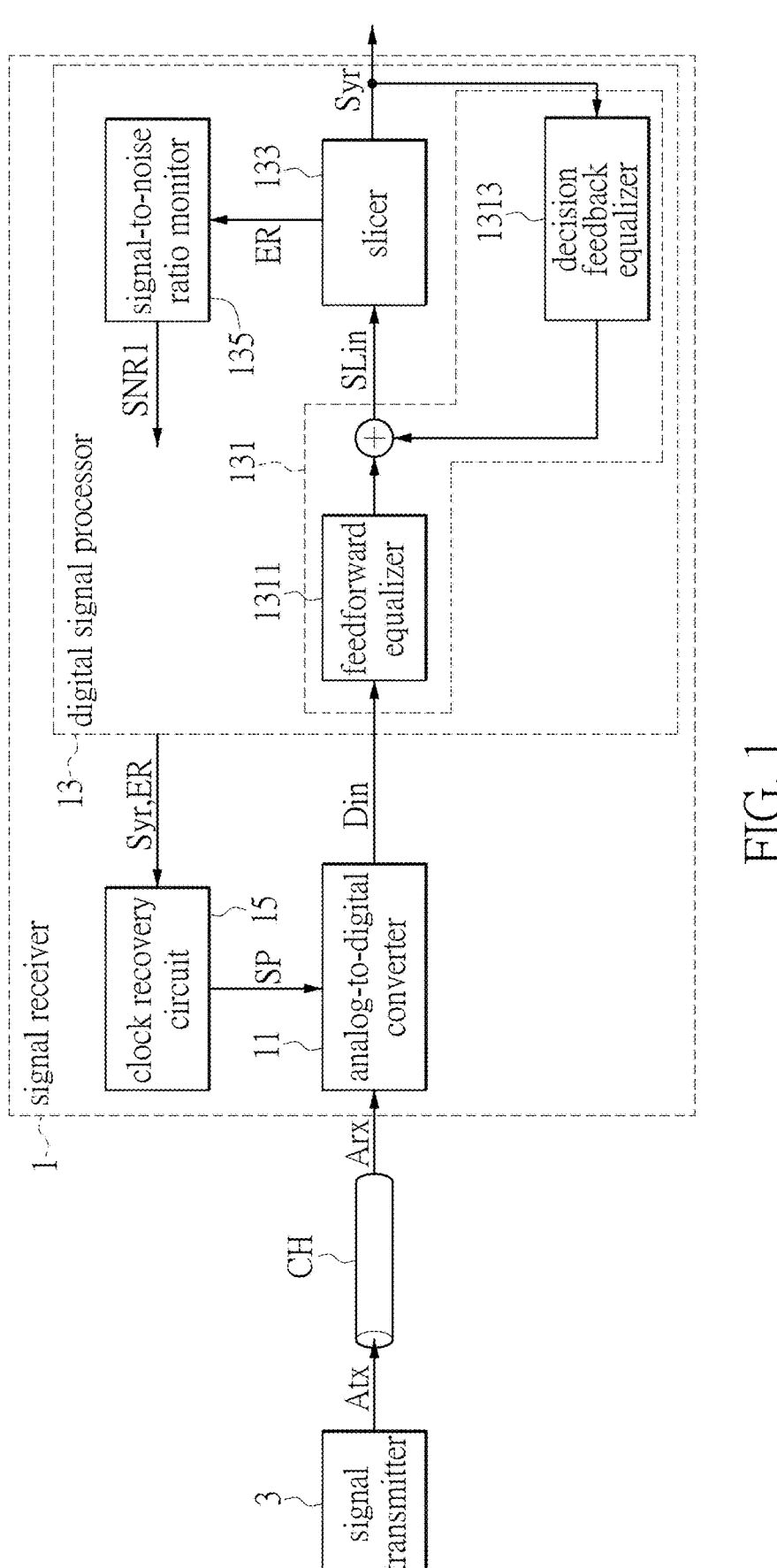
FIG. 1 is a functional block diagram of a signal receiver according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a functional block diagram of a signal receiver according to one embodiment of the present disclosure. As shown in FIG. 1, a signal receiver 1 can receive an analog reception signal Arx, and includes an analog-to-digital converter (ADC) 11 and a digital signal processor 13. The analog-to-digital converter 11 is coupled to the digital signal processor 13, and is configured to convert the analog reception signal Arx into a digital input signal Din according to a sampling phase SP. The digital signal processor 13 includes a target digital equalizer 131, a slicer 133, and a signal-to-noise ratio monitor 135.

The target digital equalizer 131 receives the digital input signal Din, and outputs a slicer input signal SLin after filtering of inter-symbol interference. It should be noted that the target digital equalizer 131 has an equalizer coefficient, and the filtering ability of the target digital equalizer 131 for the inter-symbol interference can be affected by the equalizer coefficient. In addition, depending on the function, the target digital equalizer 131 can include a feedforward equalizer 1311 and a decision feedback equalizer 1313. However, a specific implementation of the target digital equalizer 131 is not limited in the present disclosure. Generally, the feedforward equalizer 1311 and the decision feedback equalizer 1313 can be used to filter out the inter-symbol interference of post-indicators, and the feedforward equalizer 1311 can also be used to filter out the inter-symbol interference of pre-indicators.

The slicer 133 is coupled to the target digital equalizer 131, and generates a reception symbol Syr according to the slicer input signal SLin. The slicer 133 can also calculate a slicer error ER according to the slicer input signal SLin and the reception symbol Syr. The signal-to-noise ratio monitor 135 is coupled to the slicer 133, and calculates a signal-to-noise ratio SNR1 of the slicer input signal SLin according to the slicer error ER. The operation concept of the digital signal processor 13 is well known to those skilled in the art, and details thereof will not be reiterated herein.

Due to the inter-symbol interference introduced after traveling through a transmission channel CH, an analog transmission signal Atx transmitted by a signal transmitter 3 becomes the analog reception signal Arx received by the signal receiver 1. However, different ones of the transmission channel CH (e.g., the transmission channels CH having different lengths and medium properties) have different channel responses, and correspond to different equalizer coefficients. Furthermore, during the lengthy process of transmitting and receiving signals by the signal transmitter 3 and the signal receiver 1, the transmission channel CH may be time-variant as a result of changes in an external environment.

In other words, the channel response of the transmission channel CH varies with time. Hence, in order to detect the equalizer coefficient corresponding to a current one of the transmission channels CH and maintain the coefficient accuracy during the long process of transmitting and receiving signals, the target digital equalizer 131 can be an adaptive equalizer that adapts to channel changes by automatically updating the equalizer coefficient according to an optimization algorithm. In the present embodiment, the optimization algorithm can be a gradient descent algorithm. However, the present disclosure is not limited thereto.

Specifically, the filtering ability of the target digital equalizer 131 for the inter-symbol interference can be improved with the continuous update of the equalizer coefficient, such that the slicer error ER is reduced, and the signal-to-noise ratio SNR1 of the slicer input signal SLin is increased. Finally, when the slicer error ER approaches zero, the equalizer coefficient of the target digital equalizer 131 is no longer updated, and coefficient convergence is achieved. In order to achieve the coefficient convergence more quickly and ensure the success of the coefficient convergence, the present disclosure provides a method and a system for setting a digital equalizer, so as to obtain a plurality of coefficient initial values and a plurality of coefficient limit values that respectively correspond to a plurality of preset transmission channels. In addition, the equalizer coefficient of the target digital equalizer 131 is set according to the coefficient initial value and the coefficient limit value corresponding to one of the preset transmission channels.

Figure 2:
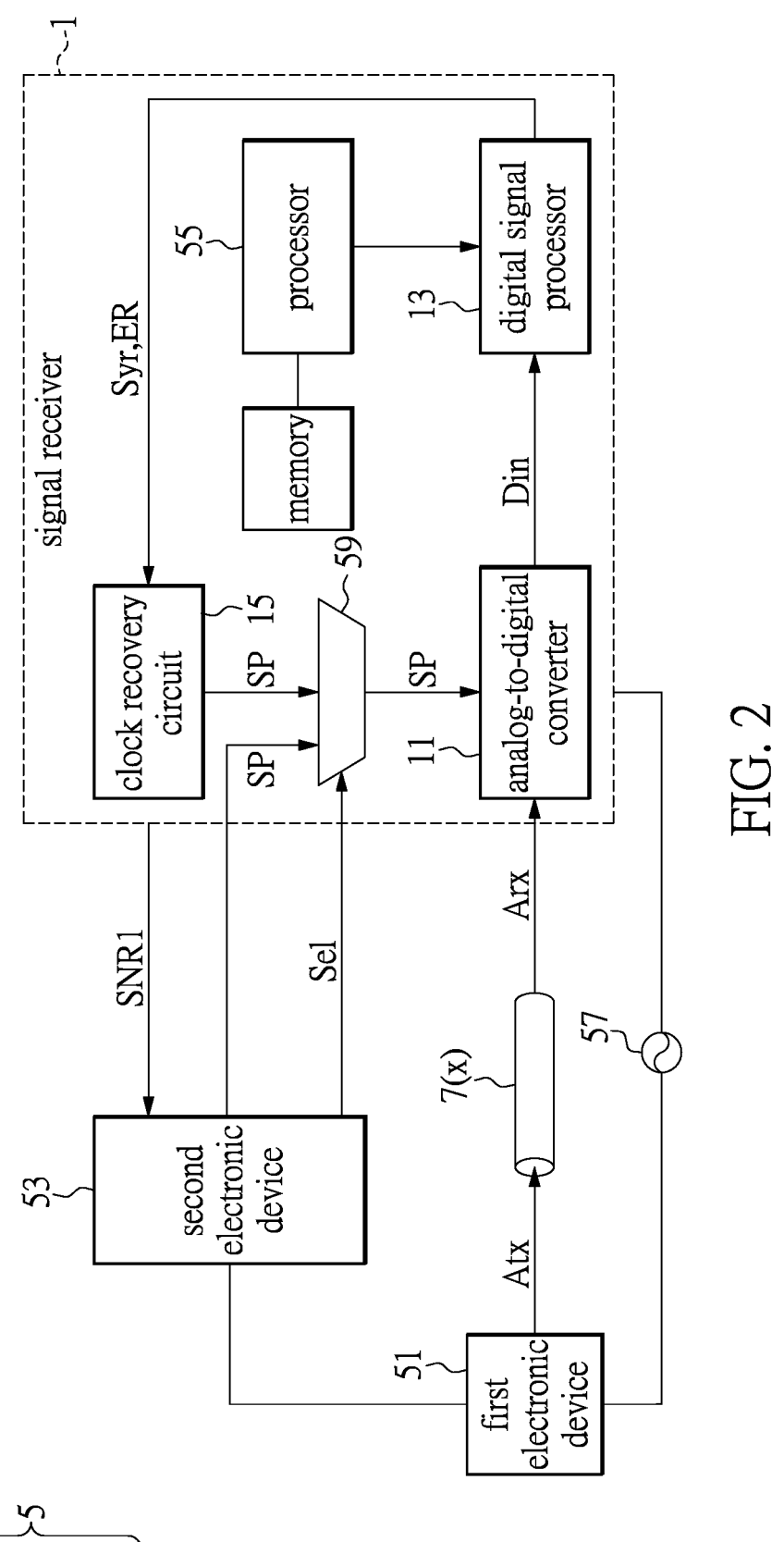
FIG. 2 is a functional block diagram of a system for setting a digital equalizer according to one embodiment of the present disclosure.

In the present disclosure, before the target digital equalizer 131 automatically updates the equalizer coefficient, a value of the equalizer coefficient is set as the coefficient initial value. The so-called coefficient limit value refers to an update limit of the equalizer coefficient. That is to say, the coefficient limit value can include an upper limit value and a lower limit value. Referring to FIG. 2 and FIG. 3, FIG. 2 is a functional block diagram of a system for setting a digital equalizer according to one embodiment of the present disclosure, and FIG. 3 is a flowchart of a method for setting the digital equalizer according to one embodiment of the present disclosure. As shown in FIG. 2, a system 5 of the present embodiment is applicable to the signal receiver 1, and includes a first electronic device 51, a second electronic device 53, and a processor 55.

During a simulation phase, the first electronic device 51 is configured as a link partner to sequentially select one of the preset transmission channels for connection with the signal receiver 1. It should be noted that the so-called simulation phase refers to a product verification and test phase before the signal receiver 1 is shipped from a factory. However, the present disclosure is not limited thereto. In addition, a phase in which the shipped signal receiver 1 and the signal transmitter 3 receive and transmit signals via the current transmission channel CH is defined as a connection phase.

For ease of illustration, the preset transmission channels of the present embodiment are exemplified to be an N number of preset transmission channels 7(1) to 7(N). Nevertheless, in FIG. 2, the first electronic device 51 is only shown to be connected to the signal receiver 1 via an xth preset transmission channel 7($x$) of the N preset transmission channels 7(1) to 7(N). That is to say, N is an integer greater than 1, and x is an integer ranging between 1 and N. However, a specific value of each of N and x is not limited in the present disclosure. Furthermore, the first electronic device 51 can be a chip that is capable of communicating with the signal receiver 1, but a specific implementation of the first electronic device 51 is not limited in the present disclosure.

The preset transmission channels 7(1) to 7(N) can be transmission channels having different lengths and medium properties. In the present embodiment, the signal receiver 1 can be a reception end of Ethernet. As such, the preset transmission channels 7(1) to 7(N) can be a plurality of Ethernet cables having different cable lengths and cable materials, but the present disclosure is not limited thereto. In order to ensure no frequency shift between a transmission end and the reception end (i.e., the first electronic device 51 and the signal receiver 1), the system 5 can further include an oscillator 57. The oscillator 57 is configured to provide a clock rate to the first electronic device 51 and the signal receiver 1 during the simulation phase.

In other words, in the present embodiment, one oscillator is jointly used by the transmission end and the reception end during the simulation phase, so as to prevent oscillation frequency differences caused by different oscillators and ensure clock rate consistency between the transmission end and the reception end during the simulation phase. Moreover, the second electronic device 53 is coupled to the first electronic device 51 and the signal receiver 1 during the simulation phase, and can be implemented by cooperation of hardware (e.g., a central processing unit and a computer memory), software, and/or firmware. However, a specific implementation of the second electronic device 53 is not limited in the present disclosure.

Specifically, the second electronic device 53 can be a computer, and is configured to execute a search program each time when the first electronic device 51 is connected to the signal receiver 1 via one of the preset transmission channels 7(1) to 7(N), so as to obtain a plurality of coefficient initial values and a plurality of coefficient limit values that respectively correspond to the preset transmission channels 7(1) to 7(N). Taking FIG. 2 as an example, the second electronic device 53 executes the search program when the first electronic device 51 is connected to the signal receiver 1 via the xth preset transmission channel 7($x$), so as to obtain the coefficient initial value and the coefficient limit value corresponding to the xth preset transmission channel 7($x$). The second electronic device 53 can also write the coefficient initial values and the coefficient limit values that respectively correspond to the preset transmission channels 7(1) to 7(N) into a memory (not shown in the figures) of the signal receiver 1.

Since the preset transmission channels 7(1) to 7(N) can be the Ethernet cables having different cable lengths and cable materials, each preset transmission channel can be represented by a combination of its cable length and cable material, and the second electronic device 53 can obtain the coefficient initial values and the coefficient limit values for various combinations of different cable lengths and cable materials. Furthermore, the memory of the signal receiver 1 can record the cable length and the cable material of each preset transmission channel, and record the coefficient initial values and the coefficient limit values that respectively correspond to the preset transmission channels 7(1) to 7(N). That is to say, the memory of the signal receiver 1 can record the various combinations of different cable lengths and cable materials, and record the coefficient initial values and the coefficient limit values for the various combinations of different cable lengths and cable materials.

The processor 55 is disposed in the signal receiver 1, and is coupled to the digital signal processor 13. During the connection phase, the processor 55 is configured to set the equalizer coefficient of the target digital equalizer 131 according to the coefficient initial value and the coefficient limit value corresponding to one of the preset transmission channels. In the present embodiment, the processor 55 can determine whether or not one of the preset transmission channels matches the current transmission channel CH. In response to determining that one of the preset transmission channels matches the current transmission channel CH, the processor 55 sets the equalizer coefficient of the target digital equalizer 131 according to the coefficient initial value and the coefficient limit value corresponding to the preset transmission channel that matches the current transmission channel CH.

Based on the above, the processor 55 can determine whether or not the various combinations of different cable lengths and cable materials recorded in the memory of the signal receiver 1 include a combination of the cable length and the cable material of the current transmission channel CH. If yes, it indicates that one of the preset transmission channels matches the current transmission channel CH.

Specifically, if the cable length and the cable material of the xth preset transmission channel 7($x$) recorded in the memory are the same as those of the current transmission channel CH, this indicates that the xth preset transmission channel 7($x$) matches the current transmission channel CH. As such, the processor 55 will read the coefficient initial value and the coefficient limit value corresponding to the xth preset transmission channel 7($x$) from the memory, so as to set the equalizer coefficient of the target digital equalizer 131. It should be noted that, during the connection phase, the signal receiver 1 can first perform channel estimation to obtain the cable length and the cable material of the current transmission channel CH. However, the present disclosure is not limited thereto.

In other words, if the coefficient initial value and the coefficient limit value for a combination of the current cable length and the current cable material are recorded in the memory of the signal receiver 1, the processor 55 can read the coefficient initial value and the coefficient limit value for the combination of the current cable length and the current cable material from the memory, and use the same for setting the equalizer coefficient of the target digital equalizer 131. As mentioned above, before the target digital equalizer 131 automatically updates the equalizer coefficient, the processor 55 reads the coefficient initial value and the coefficient limit value for the combination of the current cable length and the current cable material from the memory, sets the value of the equalizer coefficient as the coefficient initial value, and sets upper and lower update limits of the equalizer coefficient as the coefficient limit value.

Based on the above, in the present embodiment, the method that is applicable to the signal receiver 1 and used for setting the digital equalizer mainly includes the following steps (as shown in FIG. 3).

Step S300: configuring, during the simulation phase, a first electronic device as a link partner to sequentially select one of the preset transmission channels for connection with a signal receiver, and configuring a second electronic device to execute the search program each time when the first electronic device is connected to the signal receiver via one of the preset transmission channels, so as to obtain the coefficient initial values and the coefficient limit values that respectively correspond to the above-mentioned preset transmission channels.

Step S302: configuring, during the connection phase, a processor to set the equalizer coefficient of a target digital equalizer according to the coefficient initial value and the coefficient limit value corresponding to one of the preset transmission channels.

It should be noted that the method of the present embodiment can further include: configuring the second electronic device to write the coefficient initial values and the coefficient limit values that respectively correspond to the above-mentioned preset transmission channels into the memory of the signal receiver. Implementation details of each step are the same as those mentioned above, and will not be reiterated herein.

Figure 4B:
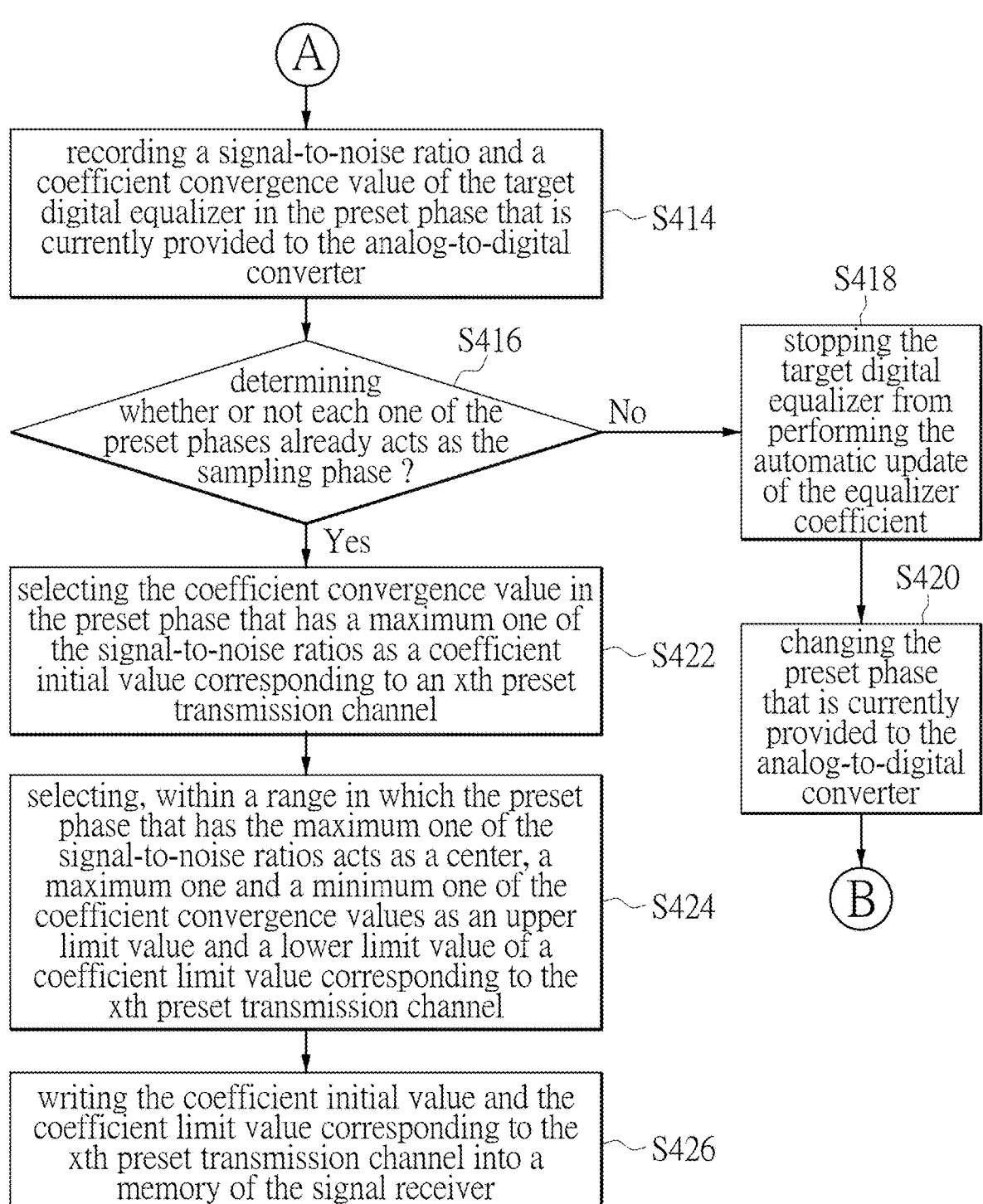

Reference is made to FIG. 4A and FIG. 4B, which are flowcharts of a search program according to one embodiment of the present disclosure. As shown in FIG. 4A and FIG. 4B, the search program executed by the second electronic device 53 when the first electronic device 51 is connected to the signal receiver 1 via the xth preset transmission channel 7(x) can include the following steps.

Step S400: replacing a clock recovery circuit with the second electronic device for providing a sampling phase to an analog-to-digital converter, and sequentially selecting, by the second electronic device, one of a plurality of preset phases as the sampling phase to be provided to the analog-to-digital converter.

Step S402: configuring the first electronic device to transmit an analog transmission signal.

Step S404: determining whether or not the signal receiver receives an analog reception signal. If not, the search program returns to step S402. If yes, the search program proceeds to step S406.

Step S406: using the preset phase that is currently provided to the analog-to-digital converter as a phase zero.

Step S408: resetting the equalizer coefficient of the target digital equalizer.

Step S410: configuring the target digital equalizer to perform an automatic update of the equalizer coefficient (i.e., starting the coefficient convergence).

Step S412: determining whether or not the equalizer coefficient of the target digital equalizer achieves the coefficient convergence. If not, the search program returns to step S410. If yes, the search program proceeds to step S414.

Step S414: recording a signal-to-noise ratio and a coefficient convergence value of the target digital equalizer in the preset phase that is currently provided to the analog-to-digital converter.

Specifically, when the first electronic device 51 is connected to the signal receiver 1 via the xth preset transmission channel 7(x), the second electronic device 53 can enable the first electronic device 51 to transmit the analog transmission signal Atx. At this time, due to the inter-symbol interference introduced after traveling through the xth preset transmission channel 7(x), the analog transmission signal Atx transmitted by the first electronic device 51 becomes the analog reception signal Arx received by the signal receiver 1. The second electronic device 53 can further enable the target digital equalizer 131 to perform the automatic update of the equalizer coefficient until achieving the coefficient convergence. However, the analog-to-digital converter 11 samples the analog reception signal Arx according to the sampling phase SP, so as to generate the digital input signal Din.

If deviation of the sampling phase SP is too great, a sampling result will be subjected to distortion, thereby causing the digital input signal Din to be erroneous and easily causing abnormal convergence of the equalizer coefficient of the target digital equalizer 131. As a result, the convergence of the equalizer coefficient of the target digital equalizer 131 depends on having the analog reception signal Arx sampled by the analog-to-digital converter 11 according to the correct sampling phase SP. That is to say, convergence performance of the equalizer coefficient of the target digital equalizer 131 can be affected by the sampling phase SP. Moreover, the signal receiver 1 can further include a clock recovery circuit 15 (as shown in FIG. 1).

The clock recovery circuit 15 is coupled to the digital signal processor 13 and the analog-to-digital converter 11, and is configured to provide the sampling phase SP. Generally, the clock recovery circuit 15 estimates a phase error according to the reception symbol Syr and the slicer error ER, and adjusts the sampling phase SP according to the phase error. When the sampling phase is adjusted by the clock recovery circuit 15 to be optimal, the estimated phase error approaches zero, so as to achieve clock recovery circuit convergence. On this basis, the convergence performance of the equalizer coefficient of the target digital equalizer 131 can also be affected by the clock recovery circuit convergence.

On the other hand, in order to accurately estimate the phase error, the digital signal processor 13 needs to ensure the correctness of the reception symbol Syr and the slicer error ER that are input into the clock recovery circuit 15. While the correctness of the reception symbol Syr and the slicer error ER can be affected by the filtering ability of the target digital equalizer 131 for the inter-symbol interference, the filtering ability of the target digital equalizer 131 for the inter-symbol interference is susceptible to the convergence performance of the equalizer coefficient of the target digital equalizer 131. That is to say, the clock recovery circuit 15 can operate normally and achieve the clock recovery circuit convergence only when the filtering ability of the target digital equalizer 131 for the inter-symbol interference is great enough (i.e., the target digital equalizer 131 needs to be able to decrease the inter-symbol interference within a signal to a certain degree). Hence, for the signal receiver 1, an inevitable convergence problem is caused by the target digital equalizer 131 and the clock recovery circuit 15 interfering with one another.

In order to solve the above-mentioned problem, in the search program of the present disclosure, the second electronic device 53 is used to replace the clock recovery circuit 15 for providing the sampling phase SP to the analog-to-digital converter 11 (i.e., step S400). In practice, the system 5 can further include a multiplexer 59 (as shown in FIG. 2). The multiplexer 59 has two input ends and one output end, which are coupled to the second electronic device 53, the clock recovery circuit 15, and the analog-to-digital converter 11, respectively. The multiplexer 59 can further have a control end for receiving a selection signal Sel. According to the selection signal Sel, the multiplexer 59 can select and output the sampling phase SP provided by the second electronic device 53 or the clock recovery circuit 15 to the analog-to-digital converter 11.

During the connection phase, the multiplexer 59 selects and outputs the sampling phase SP provided by the clock recovery circuit 15. However, in the search program, by outputting the selection signal Sel via the second electronic device 53, the multiplexer 59 selects and outputs the sampling phase SP provided by the second electronic device 53 to the analog-to-digital converter 11. In this way, a user can solve the problem of the target digital equalizer 131 and the clock recovery circuit 15 interfering with one another. While the clock recovery circuit 15 adjusts the sampling phase SP according to the phase error, the second electronic device 53 sequentially selects one of the preset phases (e.g., 128 preset phases) as the sampling phase SP to be provided to the analog-to-digital converter 11.

Furthermore, by recording convergence results of the equalizer coefficient of the target digital equalizer 131 in different preset phases (i.e., different sampling phases SP), the second electronic device 53 can obtain the coefficient initial value and the coefficient limit value corresponding to the xth preset transmission channel 7(x). In order to identify different preset phases, the second electronic device 53 in step S406 will use the preset phase that is currently provided to the analog-to-digital converter 11 (e.g., a 1st preset phase out of the 128 preset phases) as the phase zero. In addition, the digital signal processor 13 outputs the signal-to-noise ratio SNR1 of the slicer input signal SLin and the equalizer coefficient (not shown in the figures) of the target digital equalizer 131 to the second electronic device 53. In response to the equalizer coefficient of the target digital equalizer 131 achieving the coefficient convergence, the second electronic device 53 records the signal-to-noise ratio SNR1 and the coefficient convergence value of the target digital equalizer 131 in the preset phase that is currently provided to the analog-to-digital converter 11.

Specifically, in order to record the convergence result of the equalizer coefficient of the target digital equalizer 131 in each one of the preset phases, the search program executed by the second electronic device 53 when the first electronic device 51 is connected to the signal receiver 1 via the xth preset transmission channel 7(x) can further include the following steps.

Step S416: determining whether or not each one of the preset phases is already provided to the analog-to-digital converter as the sampling phase. If not, the search program proceeds from step S418 to step S420, and returns to step S408 after step S420. If yes, the search program proceeds from step S422 to step S426.

Step S418: stopping the target digital equalizer from performing the automatic update of the equalizer coefficient (i.e., ending the coefficient convergence).

Step S420: changing the preset phase that is currently provided to the analog-to-digital converter.

Through execution in a continuous and cyclic manner, the second electronic device 53 can record the signal-to-noise ratio SNR1 and the coefficient convergence value in each one of the preset phases. Furthermore, in response to determining that each one of the preset phases is already provided to the analog-to-digital converter 11 as the sampling phase SP, the search program can proceed from step S422 to step S426.

Step S422: selecting the coefficient convergence value in the preset phase that has a maximum one of the signal-to-noise ratios as a coefficient initial value corresponding to an xth preset transmission channel.

Step S424: selecting, within a range in which the preset phase that has the maximum one of the signal-to-noise ratios acts as a center, a maximum one and a minimum one of the coefficient convergence values as an upper limit value and a lower limit value of a coefficient limit value corresponding to the xth preset transmission channel.

Step S426: writing the coefficient initial value and the coefficient limit value corresponding to the xth preset transmission channel into the memory of the signal receiver.

Specifically, if a 64th preset phase out of the 128 preset phases has a maximum one of the signal-to-noise ratios SNR1, the second electronic device 53 can select a coefficient convergence value in the 64th preset phase as the coefficient initial value corresponding to the xth preset transmission channel 7(x), and can select a maximum one and a minimum one of the coefficient convergence values as an upper limit value and a lower limit value of the coefficient limit value corresponding to the xth preset transmission channel 7(x) within a range in which the 64th preset phase acts as a center.

In the present embodiment, the range is determined based on an M/2 number of preset phases before and after the center, and M is determined based on a total number (i.e., N) of the preset transmission channels. Here, M is N*20%. Hence, in a situation where there are 128 preset phases, M/2 is 13. That is to say, the range at this time includes 13 preset phases before and after the 64th preset phase (i.e., between a 51st preset phase and a 77th preset phase). Then, the second electronic device 53 can select the maximum one and the minimum one of the coefficient convergence values as the upper limit value and the lower limit value of the coefficient limit value corresponding to the xth preset transmission channel 7(x).

For example, the coefficient convergence value in the 64th preset phase is 0.1, and the maximum one and the minimum one of the coefficient convergence values between the 51st preset phase and the 77th preset phase are 0.13 and 0.05, respectively. As such, the second electronic device 53 records the coefficient initial value corresponding to the xth preset transmission channel 7(x) as 0.1, and records the upper limit value and the lower limit value of the coefficient limit value corresponding to the xth preset transmission channel 7(x) as 0.13 and 0.05, respectively. Furthermore, during the connection phase, if the xth preset transmission channel 7(x) matches the current transmission channel CH, the processor 55 can set the value of the equalizer coefficient as 0.1 before the target digital equalizer 131 automatically updates the equalizer coefficient, and can set the upper limit value and the lower limit value for updating the equalizer coefficient as 0.13 and 0.05, respectively.

Beneficial Effects of the Embodiments

In conclusion, in the method and the system for setting the digital equalizer provided by the present disclosure, by virtue of "configuring, during the simulation phase, the first electronic device as a link partner to sequentially select one of the preset transmission channels for connection with the signal receiver, and configuring the second electronic device to execute the search program each time when the first electronic device is connected to the signal receiver via one of the preset transmission channels," the coefficient initial values and the coefficient limit values that respectively correspond to the above-mentioned preset transmission channels can be obtained. In this way, the equalizer coefficient of the target digital equalizer can be set during the connection phase.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for setting a digital equalizer, the method being applicable to a signal receiver, the signal receiver including a digital signal processor, the digital signal processor including a target digital equalizer, the target digital equalizer having an equalizer coefficient, and the method comprising:

configuring, during a simulation phase, a first electronic device as a link partner to sequentially select one of a plurality of preset transmission channels for connection with the signal receiver, and configuring a second electronic device to execute a search program each time when the first electronic device is connected to the signal receiver via one of the plurality of preset transmission channels, so as to obtain a plurality of coefficient initial values and a plurality of coefficient limit values that respectively correspond to the plurality of preset transmission channels; and configuring, during a connection phase, a processor to set the equalizer coefficient of the target digital equalizer according to one of the plurality of coefficient initial values and one of the plurality of coefficient limit values corresponding to one of the plurality of preset transmission channels.

2. The method according to claim 1, wherein the connection phase is a phase in which the signal receiver receives signals from a signal transmitter via a current transmission channel; wherein the process of the processor setting the equalizer coefficient of the target digital equalizer according to one of the plurality of coefficient initial values and one of the plurality of coefficient limit values corresponding to one of the plurality of preset transmission channels includes:

determining whether or not one of the plurality of preset transmission channels matches the current transmission channel, and setting, in response to determining that one of the plurality of preset transmission channels matches the current transmission channel, the equalizer coefficient of the target digital equalizer according to one of the plurality of coefficient initial values and one of the plurality of coefficient limit values corresponding to one of the plurality of preset transmission channels that matches the current transmission channel.

3. The method according to claim 2, wherein the signal receiver further includes:

an analog-to-digital convertor coupled to the digital signal processor, wherein the analog-to-digital convertor is configured to convert an analog reception signal into a digital input signal according to a sampling phase; wherein the target digital equalizer receives the digital input signal, and outputs a slicer input signal after filtering of inter-symbol interference; and a clock recovery circuit coupled to the digital signal processor and the analog-to-digital converter, wherein the clock recovery circuit is configured to provide the sampling phase.

4. The method according to claim 3, wherein the search program executed by the second electronic device each time when the first electronic device is connected to the signal receiver via one of the plurality of preset transmission channels includes processes of:

switching the clock recovery circuit with the second electronic device for providing the sampling phase to the analog-to-digital converter, and sequentially selecting, by the second electronic device, one of a plurality of preset phases as the sampling phase to be provided to the analog-to-digital converter;

configuring the first electronic device to transmit an analog transmission signal;

determining whether or not the signal receiver receives the analog reception signal;

using, in response to determining that the signal receiver receives the analog reception signal, one of the plurality of preset phases that is currently provided to the analog-to-digital converter as a phase zero;

resetting the equalizer coefficient of the target digital equalizer;

configuring the target digital equalizer to perform an automatic update of the equalizer coefficient;

determining whether or not the equalizer coefficient of the target digital equalizer achieves coefficient convergence; and recording, in response to determining that the equalizer coefficient of the target digital equalizer achieves the coefficient convergence, a signal-to-noise ratio and a coefficient convergence value of the target digital equalizer in one of the plurality of preset phases that is currently provided to the analog-to-digital converter.

5. The method according to claim 4, wherein the search program executed by the second electronic device each time when the first electronic device is connected to the signal receiver via one of the plurality of preset transmission channels further includes processes of:

determining whether or not each of the plurality of preset phases is already provided to the analog-to-digital converter as the sampling phase;

stopping, in response to determining that not each of the plurality of preset phases is already provided to the analog-to-digital converter as the sampling phase, the target digital equalizer from performing the automatic update of the equalizer coefficient, and changing one of the plurality of preset phases that is currently provided to the analog-to-digital converter; and re-executing, after changing one of the plurality of preset phases that is currently provided to the analog-to-digital converter, the process of resetting the equalizer coefficient of the target digital equalizer.

6. The method according to claim 5, wherein the search program executed by the second electronic device each time when the first electronic device is connected to the signal receiver via one of the plurality of preset transmission channels further includes processes of:

selecting, in response to determining that each of the plurality of preset phases is already provided to the analog-to-digital converter as the sampling phase, the coefficient convergence value in one of the plurality of preset phases that has a maximum one of signal-to-noise ratios as one of the plurality of coefficient initial values corresponding to one of the plurality of preset transmission channels, and selecting, within a range in which one of the plurality of preset phases that has the maximum one of the signal-to-noise ratios acts as a center, a maximum one of the coefficient convergence value and a minimum one of the coefficient convergence value as an upper limit value and a lower limit value of the coefficient limit value corresponding to one of the plurality of preset transmission channels; and writing one of the plurality of coefficient initial values and one of the plurality of coefficient limit values corresponding to one of the plurality of preset transmission channels into a memory of the signal receiver.

7. A system for setting a digital equalizer, the system being applicable to a signal receiver, the signal receiver including a digital signal processor, the digital signal processor including a target digital equalizer, the target digital equalizer having an equalizer coefficient, and the system comprising:

a first electronic device, wherein, during a simulation phase, the first electronic device is configured as a link partner to sequentially select one of a plurality of preset transmission channels for connection with the signal receiver;

a second electronic device coupled to the first electronic device and the signal receiver during the simulation phase, wherein the second electronic device is configured to execute a search program each time when the first electronic device is connected to the signal receiver via one of the plurality of preset transmission channels, so as to obtain a plurality of coefficient initial values and a plurality of coefficient limit values that respectively correspond to one of the plurality of preset transmission channels; and a processor disposed in the signal receiver, wherein, during a connection phase, the processor is configured to set the equalizer coefficient of the target digital equalizer according to one of the plurality of coefficient initial values and one of the plurality of coefficient limit value corresponding to one of the plurality of preset transmission channels.

8. The system according to claim 7, wherein the connection phase is a phase in which the signal receiver receives signals from a signal transmitter via a current transmission channel; wherein the process of the processor setting the equalizer coefficient of the target digital equalizer according to one of the plurality of coefficient initial values and one of the plurality of coefficient limit values corresponding to one of the plurality of preset transmission channels includes:

determining whether or not one of the plurality of preset transmission channels matches the current transmission channel, and setting, in response to determining that one of the plurality of preset transmission channels matches the current transmission channel, the equalizer coefficient of the target digital equalizer according to one of the plurality of coefficient initial values and one of the plurality of coefficient limit values corresponding to one of the plurality of preset transmission channels that matches the current transmission channel.

9. The system according to claim 8, wherein the signal receiver further includes:

an analog-to-digital convertor coupled to the digital signal processor, wherein the analog-to-digital convertor is configured to convert an analog reception signal into a digital input signal according to a sampling phase; wherein the target digital equalizer receives the digital input signal, and outputs a slicer input signal after filtering of inter-symbol interference; and a clock recovery circuit coupled to the digital signal processor and the analog-to-digital converter, wherein the clock recovery circuit is configured to provide the sampling phase.

10. The system according to claim 9, wherein the search program executed by the second electronic device each time when the first electronic device is connected to the signal receiver via one of the plurality of preset transmission channels includes processes of:

switching the clock recovery circuit with the second electronic device for providing the sampling phase to the analog-to-digital converter, and sequentially selecting, by the second electronic device, one of a plurality of preset phases as the sampling phase to be provided to the analog-to-digital converter;

configuring the first electronic device to transmit an analog transmission signal;

determining whether or not the signal receiver receives the analog reception signal;

using, in response to determining that the signal receiver receives the analog reception signal, one of the plurality of preset phases that is currently provided to the analog-to-digital converter as a phase zero;

resetting the equalizer coefficient of the target digital equalizer;

configuring the target digital equalizer to perform an automatic update of the equalizer coefficient;

determining whether or not the equalizer coefficient of the target digital equalizer achieves coefficient convergence; and recording, in response to determining that the equalizer coefficient of the target digital equalizer achieves the coefficient convergence, a signal-to-noise ratio and a coefficient convergence value of the target digital equalizer in one of the plurality of preset phases that is currently provided to the analog-to-digital converter.

11. The system according to claim 10, wherein the search program executed by the second electronic device each time when the first electronic device is connected to the signal receiver via one of the plurality of preset transmission channels further includes processes of:

determining whether or not each of the plurality of preset phases is already provided to the analog-to-digital converter as the sampling phase;

stopping, in response to determining that not each of the plurality of preset phases is already provided to the analog-to-digital converter as the sampling phase, the target digital equalizer from performing the automatic update of the equalizer coefficient, and changing one of the plurality of preset phases that is currently provided to the analog-to-digital converter; and re-executing, after changing one of the plurality of preset phases that is currently provided to the analog-to-digital converter, the process of resetting the equalizer coefficient of the target digital equalizer.

12. The system according to claim 11, wherein the search program executed by the second electronic device each time when the first electronic device is connected to the signal receiver via one of the plurality of preset transmission channels further includes processes of:

selecting, in response to determining that each of the plurality of preset phases is already provided to the analog-to-digital converter as the sampling phase, the coefficient convergence value in one of the plurality of preset phases that has a maximum one of signal-to-noise ratios as one of the plurality of coefficient initial values corresponding to one of the plurality of preset transmission channels, and selecting, within a range in which one of the plurality of preset phases that has the maximum one of the signal-to-noise ratios acts as a center, a maximum one of the coefficient convergence value and a minimum one of coefficient convergence value as an upper limit value and a lower limit value of the coefficient limit value corresponding to one of the plurality of preset transmission channels; and writing one of the plurality of coefficient initial values and one of the plurality of coefficient limit values corresponding to one of the plurality of preset transmission channels into a memory of the signal receiver.

13. The system according to claim 7, further comprising:

an oscillator, wherein the oscillator is configured to provide a clock rate to the first electronic device and the signal receiver during the simulation phase.

* * * * *